(12) United States Patent
Kurachi (10) Patent No.: US 8,029,908 B2
(45) Date of Patent: Oct. 4, 2011

(54) SPECIFIC RESIN COMPOSITION OF POLYPHENYLENE SULFIDE, AND MOLDED COMPONENT, ELECTROPHOTOGRAPHIC TRANSFER FILM AND IMAGE-FORMING APPARATUS, USING THE SAME

(75) Inventor: Yasuo Kurachi, Tokyo (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 347 days.

(21) Appl. No.: 12/135,606

(22) Filed: Jun. 9, 2008

(65) Prior Publication Data
US 2008/0319139 A1 Dec. 25, 2008

(30) Foreign Application Priority Data
Jun. 19, 2007 (JP) ................. 2007-161268

(51) Int. Cl.
B32B 27/00 (2006.01)
C08K 3/00 (2006.01)
C08K 13/08 (2006.01)
C08L 77/00 (2006.01)

(52) U.S. Cl. ............ 428/474.4; 399/297; 399/302; 399/308; 399/313; 428/35.7; 525/420; 525/537

(58) Field of Classification Search .......... 525/420, 525/537; 399/297, 302, 308, 313; 428/35.7, 428/474.4
See application file for complete search history.

(56) References Cited

U.S. PATENT DOCUMENTS

| 7,303,822 | B1 | 12/2007 | Matsuoka et al. |
| 7,536,142 | B2* | 5/2009 | Miyamoto ............ 399/297 |
| 2006/0062607 | A1 | 3/2006 | Miyamoto |
| 2007/0265375 | A1 | 11/2007 | Ishio et al. |
| 2007/0299219 | A1 | 12/2007 | Higashioji et al. |

FOREIGN PATENT DOCUMENTS

| JP | 53-069255 | 6/1978 |
| JP | 62-197422 | 9/1987 |
| JP | 06-049356 | 2/1994 |
| JP | 09-291213 | 11/1997 |
| JP | 10-139985 | 5/1998 |
| JP | 2001-302918 | 10/2001 |
| JP | 2006-091244 | 4/2006 |
| WO | WO 2005/000964 A1 | 1/2005 |
| WO | WO 2006/030577 A1 | 3/2006 |
| WO | WO 2006/051658 | 5/2006 |

OTHER PUBLICATIONS

Notification of Reasons for Refusal issued in JP 2007-161268 dated Aug. 18, 2009, and an English Translation thereof.
An et al., "Studies on Miscibility and Phase-Separated Morphology of Nylon 4,6/Poly(Phenylene Sulfide) Blend Under Shear Flow", J. Macromol. Sci.—Phys., B41(3), pp. 407-418 (2002).
The First Office Action issued in the corresponding Chinese Patent Application No. 200810126946.7 dated May 25, 2010, and an English Translation thereof.
Decision to Grant Patent issued Dec. 15, 2009, in corresponding Japanese Patent Application No. 2007-161268, and English language translation thereof.

* cited by examiner

*Primary Examiner* — Ana Woodward
(74) *Attorney, Agent, or Firm* — Buchanan Ingersoll & Rooney PC (57) ABSTRACT

A resin composition comprises a polyphenylene sulfide resin and a nylon resin having a $\chi$-parameter of 1.3 or more at 25° C., and has one glass transition temperature, and an image-forming apparatus comprises:
a latent-image supporting member, and
an intermediate transfer member that supports a toner image transferred thereon from the latent-image supporting member and transfers the supported toner image onto an image-receiving material,
wherein the intermediate transfer member comprises a polyphenylene sulfide resin and a nylon resin having a $\chi$-parameter of 1.3 or more at 25° C., and has one glass transition temperature.

4 Claims, 4 Drawing Sheets

SPECIFIC RESIN COMPOSITION OF POLYPHENYLENE SULFIDE, AND MOLDED COMPONENT, ELECTROPHOTOGRAPHIC TRANSFER FILM AND IMAGE-FORMING APPARATUS, USING THE SAME

This application is based on application(s) No. 2007-161268 filed in Japan, the contents of which are hereby incorporated by reference.

BACKGROUND OF THE INVENTION

1. Field of the Invention

The present invention relates to a polyphenylene sulfide resin composition and a molded component made from such a resin composition, and in particular, to an electrophotographic transfer belt. More specifically, the present invention relates to a polyphenylene sulfide resin composition that is superior in toughness typically represented by impact strength, tensile extension, or the like and exerts a good uniform dispersibility when carbon is dispersed therein, and a molded component made from the resin composition, in particular, an electrophotographic transfer belt.

2. Description of the Related Art

The polyphenylene sulfide resin (hereinafter, referred to as "PPS resin") has suitable properties as an engineering plastic material, such as excellent heat resistance, flame resistance, rigidity, chemical resistance and electrical insulating property, and is used for various electric and electronic parts, mechanical parts and automobile parts, mainly as injection molding products. However, the PPS resin is not sufficiently superior in toughness in comparison with other engineering plastic materials such as a polyamide resin. For this reason, in most cases, the PPS resin is conventionally used in combination with a reinforcing agent such as glass fibers so as to improve the strength thereof.

In recent years, however, in order to meet demands for light weight, surface smoothness, and the like, there have been strong demands for the PPS resin as a non-reinforced material without using glass fibers or the like, and a non-reinforced PPS material having superior toughness has been requested.

As a method for improving the toughness of the non-reinforced PPS material, a PPS resin composition containing a polyamide resin has been known. For example, as described in JP-B No. 59-1422, JP-A No. 53-69255 and JP-A No. 6-49356, various attempts have been made so as to improve the toughness of PPS by blending a material that is superior in toughness therein. If the PPS and polyamide were dissolved uniformly like sugar dissolved in water, the problem would be solved by using the techniques as described therein. However, as described in J. MACROMOL. SCI. PHYS., B41(3), 407-418(2002), Jung-Bum An, Takeshi Suzuki, Toshiaki Ougizawa, Takashi Inoue, Kenji Mitamura and Kazuo Kawanishi, upon blending the PPS in polyamide, the two components are hardly compatible with each other, and it has been confirmed that although only 4,6-nylon is compatible therewith at a high temperature of 300° C. or more, a phase separation occurs when cooled off. As has been well-known, remarkable improvements in physical properties are achieved when upon blending a polymer and an elastomer, the two components are made compatible with each other; however, as described in the above J. MACROMOL. SCI. PHYS., B41(3), 407-418 (2002), no such combination has been found in the PPS. Consequently, the blending with another elastomer fails to provide an effective method for improving a strength property, and tends to impair not only a high modulus of elasticity, but also other superior characteristics, such as a burning property, in which the PPS possesses.

On the other hand, JP-A No. 9-291213 and JP-A No. 62-197422 have disclosed an oxidized crosslinking PPS resin having superior mechanical strength, which restrains the occurrence of weld cracks; however, this resin is not necessarily superior in toughness properties such as tensile extension and impact strength. Another problem is that oxidation crosslinking treatment is not effectively used for applications in which a molded component is obtained in a continuous producing process, such as an extrusion-molding process.

Upon application of the PPS resin composition to a transfer belt for use in electrophotography, it is necessary to add a conductive agent such as carbon thereto so as to set a conductivity of the resin within a uniform semiconductor area; however, the PPS resin is not necessarily superior in the dispersibility of carbon, and has a disadvantage in that upon extrusion-molding, the dispersion state of carbon changes to cause the nonuniformity of conductivity. The nonuniformity of the conductivity in the transfer belt causes an image loss in characters and toner scattering.

BRIEF SUMMARY OF THE INVENTION

An object of the present invention is to provide a polyphenylene sulfide resin composition that is superior in toughness without the necessity of containing any reinforcing agents.

Another object of the present invention is to provide a polyphenylene sulfide resin composition that is superior in toughness without the necessity of containing any reinforcing agents, and exerts a superior uniform dispersibility to an additive, in particular, to a conductive agent such as carbon, as well as a molded component and an electrophotographic transfer belt.

Still another object of the present invention is to provide an electrophotographic transfer belt that is superior in toughness and has a uniform conductivity.

Further another object of the present invention is to provide an image-forming apparatus that can restrain an image loss in characters and toner scattering.

The present invention provide a resin composition, comprising a polyphenylene sulfide resin and a nylon resin having a $\chi$-parameter of 1.3 or more at 25° C., and having one glass transition temperature, and a molded component, an electrophotographic transfer film and an image-forming apparatus, using the same.

DETAILED DESCRIPTION OF THE INVENTION

The present invention relates to a resin composition containing a polyphenylene sulfide resin and a nylon resin which has a χ-parameter of 1.3 or more at 25° C., and the resin composition is characterized by having one glass transition temperature, and the present invention also relates to a molded component made from the resin composition, in particular, an electrophotographic transfer belt, and an image-forming apparatus provided with such a transfer belt.

The polyphenylene sulfide resin composition of the present invention achieves compatibility between a polyphenylene sulfide resin composition and a nylon resin so that the resulting resin composition has only one glass transition temperature. For this reason, it is allowed to effectively exert high toughness inherently possessed by the nylon resin. It also exerts superior heat resistance, flame resistance, rigidity, chemical resistance, elasticity and electrical insulating property that are inherently possessed by the polyphenylene sulfide resin.

When an additive is contained in the polyphenylene sulfide resin composition of the present invention, the resulting resin composition and a molded component made from the resin composition are allowed to have uniform dispersion of the additive. As a result, in the case when the molded component is prepared, in particular, as a transfer belt to be used in an image-forming apparatus of an electrophotographic system and the additive is prepared as a conductive agent such as carbon, the transfer belt is allowed to achieve a uniform conductivity so that by using such a transfer belt, it becomes possible to prevent an image loss in characters and toner scattering.

The resin composition of the present invention is characterized by containing a polyphenylene sulfide resin (hereinafter, referred to as PPS resin) and a nylon resin and having one glass transition temperature. The reason that although the resin composition of the present invention contains at least two kinds of resins, it has only one glass transition temperature is because the PPS resin and the nylon resin are made effectively compatible with each other. Therefore, the resin composition of the present invention is allowed to simultaneously achieve superior heat resistance, flame resistance, rigidity, chemical resistance, elasticity and electrical insulating property that are inherently possessed by the PPS resin and superior toughness and surface gloss that are inherently possessed by the nylon resin.

Figure 1:
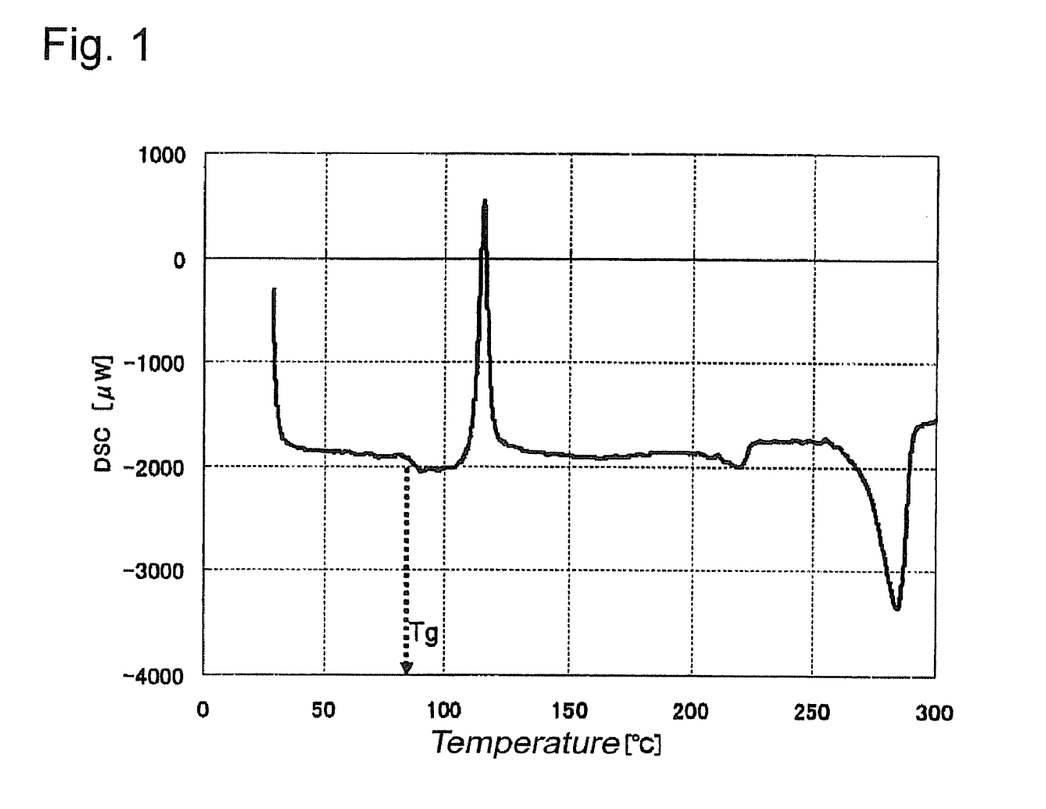
FIG. 1 is a graph that shows one example of changes in a quantity of heat when a PPS resin composition of the present invention is measured by using a DSC method.

Here, "having only one glass transition temperature" means that only one glass transition temperature is possessed, and more specifically, when the resin composition is subjected to a differential scanning calorimetry analysis (hereinafter, referred to as DSC), it exerts a glass transition only once in an area from 50° C. to 200° C. FIG. 1 is a graph that shows one example of changes in a quantity of heat when the PPS resin composition of the present invention is measured by using the DSC method, and a horizontal axis represents a change in temperature and a vertical axis represents a change in a quantity of heat, and an upper portion from a reference line indicates heat generation and a lower portion from the reference line indicates heat absorption. For example, in the graph as shown in FIG. 1, a portion near 82° C. where the reference line changes toward the heat absorption side in a virtually parallel manner indicates occurrence of a glass transition. In the present invention, such a change in the reference line indicating the glass transition appears only once in an area from 50° C. to 200° C. In FIG. 1, a sharp peak observed in an area from 100° C. to 150° C. indicates crystallization of the PPS. Here, the measuring apparatus for the DSC method is not particularly limited. With respect to the measuring conditions, the temperature-increasing rate is important, and the measuring process needs to be carried out at 5° C./min. When the temperature-increasing rate is too fast or too slow, the shape of Tg tends to deteriorate, or the measuring process of Tg is sometimes not available. As long as the Tg measured under the above-mentioned measuring conditions is available only once at 200° C. or less, the resin composition is within the range of the present invention, and allowed to achieve the objects of the present invention.

The only one glass transition temperature possessed by the resin composition of the present invention is preferably set to 90° C. or less, in particular in a range from 80 to 88° C., more preferably in a range from 83 to 87° C.

Figure 2:
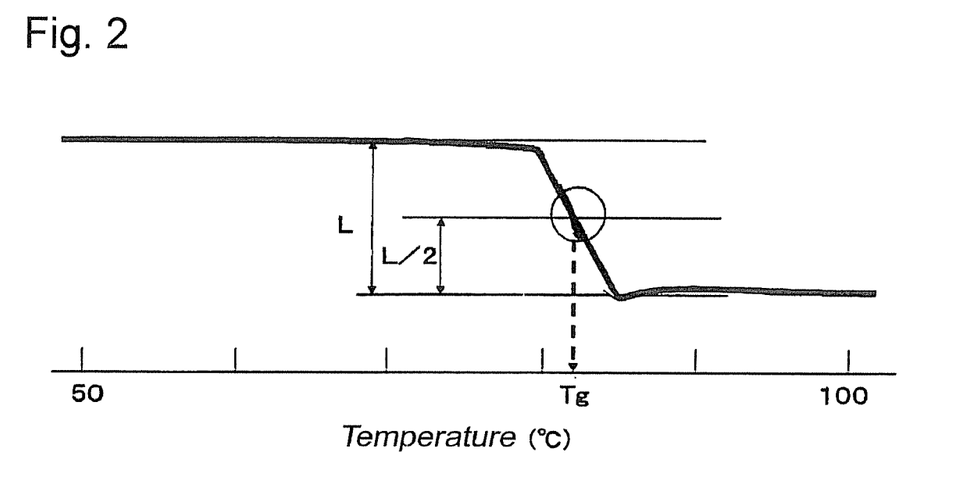
FIG. 2 is an enlarged drawing of essential portions of the graph of FIG. 1, which explains a method for determining a glass transition temperature.

In FIG. 2 that is an enlarged drawing of an essential portion of FIG. 1, a parallel line is drawn in parallel with the reference line on the low temperature side so as to be overlapped with the reference line on the high temperature side, and when a straight line is drawn at a height (L/2) corresponding to ½ of the distance (L) of these parallel lines, the glass transition temperature (Tg) can be found from an intersection point between the L/2 straight line and the heat absorption curve.

Figure 3:
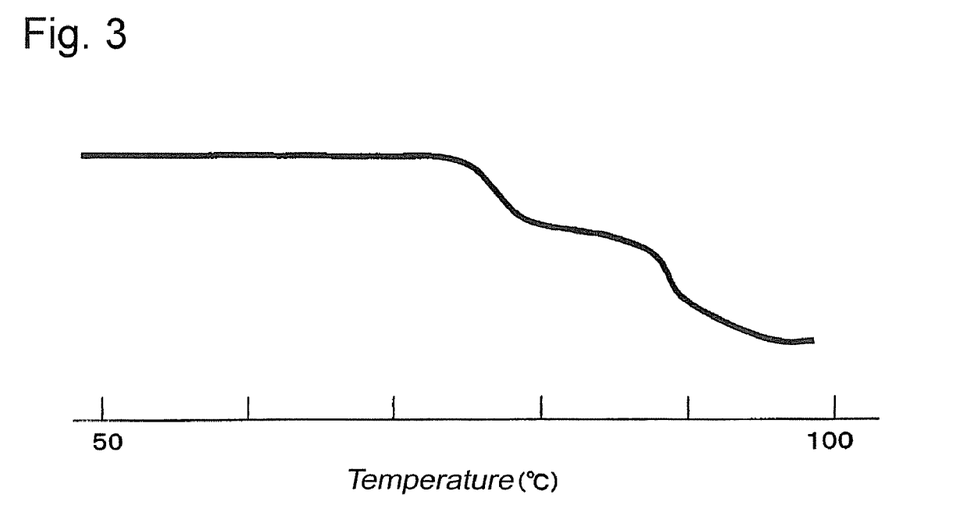
FIG. 3 is a graph that shows one example of changes in a quantity of heat when a PPS resin composition according to the prior art is measured by using a DSC method.

FIG. 3 shows an example in which two Tgs (about PPS resin and nylon resin) are observed, and since two glass transition points, each having a reference line that changes toward the heat absorption side in a virtually parallel manner, are observed, the resin composition used for the measurements is out of the range of the present invention. Since such a resin composition does not have a structure in which the PPS resin and the nylon resin are made effectively compatible with each other, it fails to provide sufficient toughness. Even when an additive such as carbon is preliminarily blended in such a resin composition, the additive is not dispersed therein uniformly.

Figure 4:
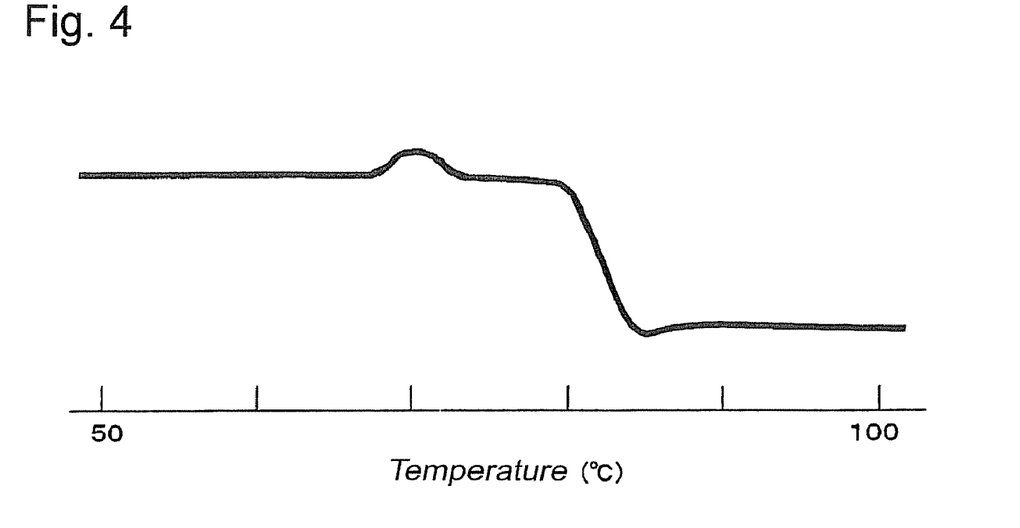
FIG. 4 is a graph that shows one example of changes in a quantity of heat when a PPS resin composition of the present invention is measured by using a DSC method.

In the present invention, as shown in FIG. 4, the crystallization peak of the nylon resin is sometimes observed in a temperature area lower than Tg. In this case also, since only one glass transition point in which the reference line changes toward the heat absorption side in a virtually parallel manner is observed, the resin composition used for the measurements is within the range of the present invention.

The PPS resin to be used in the present invention is polyphenylene sulfide effectively used as a so-called engineering plastic material. Although not particularly limited, from the viewpoint of improving the melt fluidity, the molecular weight of the PPS resin is preferably set in a range from 5000 to 1000000, in particular, from 45000 to 90000, in peak molecular weight of the molecular weight distribution found by using a gel permeation chromatograph method.

With respect to the manufacturing method for the PPS resin, not particularly limited, for example, a known manufacturing method, such as those methods disclosed in JP-B No. 52-12240 and JP-A No. 61-7332, may be used.

The PPS resin is available as a commercial polyphenylene sulfide product from Toray Industries, Inc., Dainippon Ink & Chemicals, Incorporated, or the like.

The PPS resin may be subjected to various treatments within a range without impairing the effects of the present invention, prior to the application. For example, such treatments include a heating treatment in an inert gas atmosphere such as nitrogen or under a reduced pressure, a washing treatment by using hot water or the like, and an activation treatment by using a functional-group containing compound, such as an acid anhydride, amine, isocyanate and a function-group containing disulfide compound.

The nylon resin means a resin also referred to as polyamide in the present invention, and those having a χ-parameter of 1.3 or more at 25° C., preferably in a range from 1.3 to 5.0, more preferably in a range from 1.3 to 2.5, are used.

The χ-parameter is an index indicating a degree of compatibility for two kinds of polymer components, and represents a value given based upon the PPS resin in the present invention. As the χ-parameter becomes greater, the resin becomes more difficult to be made compatible with the reference resin, while as it becomes smaller, the resin becomes easier to be made compatible therewith.

Since the χ-parameter is varied also by the side-chain group of the polymer, the χ-parameter of the nylon resin in the present specification can be obtained by executing a program SUSHI by the use of J-OCTA (made by Japan Research Institute, Ltd.).

With respect to the nylon resin, not particularly limited as long as a polyamide having a χ-parameter located within the above-mentioned range in association with the PPS resin is used, and various polyamides may be used. Specific examples thereof include: polyamides obtained by a ring-opening polymerization of lactams, such as ε-caprolactam and ω-dodecalactam; polyamides derived from amino acids, such as 6-aminocaproic acid, 11-aminoundecanoic acid and 12-aminododecanoic acid; polyamides derived from an aliphatic, alicyclic or aromatic diamine, such as ethylene diamine, tetramethylene diamine, hexamethylene diamine, undecamethylene diamine, dodecamethylene diamine, 2,2,4-/2,4,4-trimethylhexamethylene diamine, 1,3- and 1,4-bis(aminomethyl)cyclohexane, bis(4,4'-aminocyclohexyl)methane, m- and p-xylylene diamine, and an aliphatic, alicyclic or aromatic dicarboxylic acid, such as adipic acid, suberic acid, sebacic acid, dodecane diacid, 1,3- and 1,4-cyclohexane dicarboxylic acid, isophthalic acid, terephthalic acid and dimer acid, or acid derivatives thereof, such as acid halide thereof (for example, acid chloride), and copolymerized polyamides thereof; mixed polyamides thereof, and the like. In the present invention, among these, polycaproamide (nylon 6), polyundecane amide (nylon 11), polydodecane amide (nylon 12) and polyhexamethylene adipamide (nylon 66), as well as a copolymerized polyamide mainly containing these polyamide materials, are effectively used.

With respect to the polymerization degree of the nylon resin, not particularly limited, for example, selection is arbitraly made from polyamides having a relative viscosity (1 g of polymer is dissolved in 100 ml of 98% concentrated sulfuric acid, and the relative viscosity measured at 25° C.) in a range from 2.0 to 5.0 depending on the purpose of use.

With respect to a polymerization method for the nylon resin, not particularly limited, normally, a known melt polymerization method, solution polymerization method and a combined method thereof may be adopted.

The nylon resin may also be available as a commercial product, such as 6 Nylon (made by Toray Industries, Inc.) and 66 Nylon (made by E. I. DuPont de Nemours and Company).

Not particularly limited as long as the object of the present invention can be achieved, the compounding ratios of the PPS resin and the nylon resin may be set, for example, to 1 to 99% by weight of the PPS resin to 99% to 1% by weight of the nylon resin, and is normally set to 60 to 90% by weight of the PPS resin to 40 to 1% by weight of the nylon resin. In particular, in the case when the resin composition is applied to an electrophotographic transfer belt, from the viewpoint of toughness, the compounding ratios of 60 to 99% by weight of the PPS resin to 40 to 1% by weight of the nylon resin are preferably used. From the viewpoint of flame resistance, the compounding ratios of 75 to 99% by weight of the PPS resin to 25 to 1% by weight of the nylon resin are preferably used. From the viewpoint of a high modulus of elasticity, the compounding ratios of 80 to 99% by weight of the PPS resin to 20 to 1% by weight of the nylon resin are preferably used. The compounding ratios are represented by the total amount of the PPM resin and the nylon resin as 100% by weight.

The resin composition of the present invention can be produced through processes in which a mixture containing a PPS resin and a nylon resin is melt-kneaded and the kneaded matter is extruded through a slit, and then quickly cooled. In other words, the resin composition of the present invention can be produced through processes in which upon melt-kneading a mixture containing a PPS resin and a nylon resin, the kneaded matter is extruded through a comparatively thin slit, and then quickly cooled (first melt-kneading process). By extruding the kneaded matter through such a slit, PPS molecules are aligned so that nylon molecules are allowed to intrude and invade between the PPS molecules comparatively easily, with the result that the dispersibility of the nylon molecules is improved. By quickly cooling the resin composition, such a finely dispersed state of the nylon molecules in the resin composition is effectively maintained. As a result, the compatibility between the PPS resin and the nylon resin is achieved so that only one Tg is allowed to appear. Here, the following description will discuss a compatibilization phenomenon in which the compounding ratio of the PPS resin is made greater than the compounding ratio of the nylon resin; however, in the case when the compounding ratio of the PPS resin is made smaller than the compounding ratio of nylon resin, the description of the compatibilization phenomenon can be adopted by exchanging "the PPS molecules" and "the nylon molecules" with each other.

The mixture to be melt-kneaded in the first melt-kneading process may be a simply blended mixture containing at least PPS resin particles and nylon resin particles (preliminary mixing process), or may be a kneaded mixture obtained by preliminarily melt-kneading, cooling and pulverizing at least the PPM resin and the nylon resin through a conventional meld-kneading method in which the slit and the cooling method are not particularly limited (preliminarily melt-kneading process).

The melt-kneading temperature of the first melt-kneading process is set to a temperature higher than the melting points of the PPS resin and the nylon resin, and normally set in a range from 270 to 380° C. With respect to a melt-kneading machine to be used in the first melt-kneading process, not particularly limited as long as it is capable of heating to the above-mentioned temperature, and extruding the kneaded matter through a slit, and, for example, a single-screw or twin-screw extrusion-kneader may be used.

The gap distance of the slit is normally set to 3.0 mm or less, and is more preferably set in a range from 0.1 to 2.0 mm, and from the viewpoint of balance between the compatibilization and the manufacturing costs, it is preferably set in a range from 0.1 to 1.0 mm. In the case when the slit is too thick, the compatibilization is not sufficiently achieved since the PPS molecules are not effectively aligned.

The quickly cooling process can be achieved by immersing the kneaded matter as it is into water having a temperature of 0 to 60° C. The quickly cooling process may be carried out by using a gas having a temperature of −40 to 60° C. or by making the kneaded matter in contact with metal having a temperature of −40 to 60° C. For example, in the case when the quick cooling process is not carried out, that is, for example, in the case of cooling by leaving the kneaded matter at room temperature, a phase separation takes place between the PPS molecules and the nylon molecules during a comparatively long period of cooling time to cause a failure in sufficiently achieving the compatibilization since the finely dispersed state of the nylon molecules is not effectively maintained.

The quickly cooled kneaded matter is normally pelletized through a pulverizing process for easiness in the treatment of the next process.

The molded component of the present invention can be manufactured by applying any of various known molding methods, such as an injection-molding method, an extrusion-molding method, a compression-molding method, a blow-molding method and an injection-compression-molding method, to prepare the resin composition manufactured through the above-mentioned method (molding process) into an arbitrary shape. For example, examples of the a shape include shapes such as a belt (in particular, seamless annular belt), a film, a pipe and fibers. With respect to the molding method, in particular, the injection-molding method and the extrusion-molding method are desirably used. In the present invention, upon using any of these molding methods, a quickly cooling process is carried out after the molding process. By carrying out the quickly cooling process, the compatible state between the PPS resin and the nylon resin in the resin composition is effectively maintained also in the molded component, allowing the molded component to exert only one Tg. Without carrying out the quickly cooling process, aggregation would take place in the PPS molecules as well as in the nylon molecules during a comparatively long cooling period of time, with the result that since the finely dispersed state of the nylon molecules is not effectively maintained, a molded component in which the compatibility is not sufficiently achieved is obtained. In order to achieve the quickly cooling process, the same method as the quickly cooling method in the first melt-kneading process is used.

After obtaining a resin composition through the first melt-kneading process, a second melt-kneading process may be carried out prior to a molding process. With this arrangement, the melt-viscosity of the kneaded matter is lowered so that upon molding, the fluidity of the resin can be improved.

The second melt-kneading process is the same as the first melt-kneading process except that the gap distance of the slit is not particularly limited. That is, the melt-kneading process may be carried out by using a slit having a comparatively large gap distance, and the kneaded matter is quickly cooled, and normally pelletized. In the second melt-kneading process also, the compatibility in the resin composition is effectively maintained. The second melt-kneading process may be carried out repeatedly.

In the resin composition and the molded component of the present invention, normal additives, such as a conductive agent, an antioxidant, a thermal stabilizer, a lubricant, a crystallizing core agent, an ultraviolet-ray preventive agent, a colorant and a flame retarder, and a small amount of another kind of polymer may be blended, as long as the effects of the present invention are not impaired. In order to control the degree of crosslinking of the PPS, a normally-used per-oxidizer and a crosslinking accelerator such as a metal salt of thiophosphinic acid, disclosed in JP-A No. 59-131650, or a crosslinking inhibitor such as dialkyl tin dicarboxylate and aminotriazole, disclosed in JP-A No. 58-204045 and JP-A No. 58-204046, may be blended therein. In particular, when the resin composition of the present invention is used for manufacture of an electrophotographic transfer belt, or when the molded component of the present invention forms an electrophotographic transfer belt, a conductive agent is normally blended therein. In the resin composition and the molded component of the present invention, since the compatibility between the PPS resin and the nylon resin can be improved, the uniformly dispersion of the conductive agent is achieved upon blending the conductive agent. Consequently, the molded component is allowed to exert an uniform conductivity over the entire molded component. In particular, in the case when the molded component forms an electrophotographic seamless annular transfer belt, the transfer belt is allowed to have a uniform conductivity over the entire circumference thereof.

With respect to the conductive agent, not particularly limited as long as conductivity can be applied to the molded component by blending the conductive agent therein, any of known conductive agents conventionally used in the field of the electrophotographic transfer belt may be used. Specific examples of such a conductive agent include carbon black, conductive or semiconductive metal oxide fine particles, conductive polymers and the like.

The compounding ratio of the additive, in particular, the conductive agent, is 1 to 30% by weight, preferably to 5 to 20% by weight, more preferably to 5 to 15% by weight, to the total amount of the resin composition. In the case when two or more kinds of additives are blended, the compounding amount of each of the additives may be set within the above-mentioned range.

In the resin composition and the molded component of the present invention, a reinforcing agent having a fiber shape and/or a particle shape may be blended therein, if necessary, although it is not an essential component. The reinforcing agent may be blended to the total 100 parts by weight of the PPS resin and the nylon resin, within a range not exceeding 400 parts by weight. Normally, the reinforcing agent is blended in a range from 10 to 300 parts by weight so that the strength, rigidity, heat resistance, dimension stability and the like can be further improved.

Examples of the fiber-shaped reinforcing agent include inorganic fibers, such as glass fibers, shirasu glass fibers, alumina fibers, silicon carbide fibers, ceramic fibers, asbestos fibers, plaster fibers and metal fibers, carbon fibers and the like.

Examples of the particle-shaped reinforcing agent include: silicates, such as wallastenite, sericite, kaolin, mica, clay, bentonite, asbestos, talc and alumina silicate, metal oxides, such as alumina, silicon chloride, magnesium oxide, zirconium oxide and titanium oxide, carbonates, such as calcium carbonate, magnesium carbonate and dolomite, sulfates, such as calcium sulfate and barium sulfate, glass-beads, boron nitride, silicon carbide, silica and the like, and these may have a hollow structure.

Two or more kinds of reinforcing agents may be used in combination, and these may be preliminarily treated with a silane-based coupling agent, a titanium-based coupling agent or the like, if necessary, before the application.

Normally, the additives are preliminarily added to and mixed with a mixture to be subjected to the first melt-kneading process; however, these may be individually added and mixed immediately before the preliminary melt-kneading process or the second melt-kneading process, or these may be added and mixed during these processes by using a side feeder. In particular, in the case of an additive having a small compounding amount, it may be added and mixed immediately before the molding process.

The resin composition and resin molded component of the present invention may be used for various applications. Examples of the applications include: electric apparatus parts, such as generators, motors, transformers, current transformers, voltage regulators, rectifiers, inverters, relays, power contacts, switches, circuit breakers, knife switches, multipole rods and electrical component cabinets; electronic parts typically represented by sensors, LED lamps, connectors, sockets, resistors, relay cases, small-size switches, coil bobbins, capacitors, variable capacitor cases, optical pickups, oscillators, various terminal plates, transformers, plugs, printed circuit boards, tuners, speakers, microphones, headphones, small-size motors, magnetic head bases, power modules, semiconductors, liquid crystal, FDD carriages, FDD chases, motor brush holders, parabolic antennas, and computer-related parts; domestic and office electric product parts typically represented by VTR parts, television parts, electric irons, hair dryers, rice cooker parts, electronic oven parts, audio apparatus parts, sound apparatus parts, such as audio-laser-discs and compact discs, illumination parts, refrigerator parts, air-conditioner parts, typewriter parts and word processor parts; machinery-related parts typically represented by office-computer-related parts, telephone-related parts, facsimile-related parts, copying-machine-related parts, washing tools, motor parts, lighters, and typewriters; optical apparatus and precise-machine related parts typically represented by microscopes, binoculars, cameras and watches; and automobile-vehicle-related parts, such as alternator terminals, alternator connectors, IC regulators, potentiometer bases for light dyer*, various valves such as exhaust-gas valves, fuel-related, exhaust-related and suction-related various pipes, air-intake nozzle snorkels, intake manifolds, fuel pumps, engine-cooling-water joints, carburetor main bodies, carburetor spacers, exhaust-gas sensors, cooling-water sensors, oil-temperature sensors, brake-pad wear sensors, throttle-position sensors, crankshaft-position sensors, air-flowmeters, brake-pad abrasion sensors, air-conditioning thermostat bases, heating/warm-air flow-control valves, brush holders for radiator motor, water-pump impellers, turbine vanes, wiper-motor-related parts, distributors, starter switches, starter relays, wire harnesses for transmission, window-washer nozzles, air-conditioner panel switch substrates, coils for fuel-related electromagnetic valves, connectors for fuses, horn terminals, insulating plates for electric apparatus parts, step-motor rotors, lamp sockets, lamp reflectors, lamp housings, brake pistons, solenoid bobbins, engine oil filters and ignition device cases.

In the case when a conductive agent, in particular, carbon, is blended in the molded component of the present invention and the resulting molded component is used as an electrophotographic transfer belt, the effects of the present invention are further effectively obtained. Conventionally, it has been difficult to uniformly disperse the conductive agent in the PPS resin for the electrophotographic transfer belt; however, the present invention makes it possible to uniformly disperse the conductive agent therein easily. The electrophotographic transfer belt may be an intermediate transfer belt on the surface of which a toner image, formed on a photosensitive member, is once transferred, and then further transferred onto a recording material such as paper, or may be a direct-type transfer belt on which paper is sucked thereon through static electricity and a toner image, formed on a photosensitive member, is transferred on the paper.

The transfer belt of the present invention is preferably formed into a seamless annular shape. During a molding process, the transfer belt having such a shape tends to have a higher content ratio of the conductive agent within an area inside an annular metal mold die where fused resin portions are joined with each other in comparison with the other areas; however, even in such a joining area, the transfer belt of the present invention can achieve the content ratio of the conductive agent that is virtually the same level as that in the other areas.

With respect to the transfer belt of the present invention, the belt made from the above-mentioned resin composition, as it is, may be used; however, in order to improve a transferring efficiency, only the surface thereof may be hardened so that the effects of the present invention can be further effectively obtained. With respect to a method for hardening only the surface thereof, although not particularly limited, a method for coating the belt with an inorganic material is preferably used. For example, any of known methods, such as a coating method as described in "New Development of Applied Technique of Sol-Gel Method" (CMC Publishing Co., Ltd.) and a physiochemical method like CVD, PVD and plasma coating methods, described in "Introduction to Thin-Film Material" (Shoukabo Publishing Co., Ltd.), may be used. With respect to an inorganic material to be coated on the surface, not particularly limited as long as the object of the present invention is achieved, an oxide-based material containing Si, Al or C is more preferably used, from the viewpoints of physical properties and economical efficiency. Preferable examples thereof include amorphous silica thin-films, amorphous alumina thin-films, amorphous silica alumina thin-films, amorphous diamond thin-films, and the like. By coating the belt of the present invention with an inorganic thin-film having hardness higher than that of PPS, it becomes possible to provide a prolonged frictional wear life against blades and also to improve transferring properties.

The transfer belt according to the present invention may be applied to a transfer belt for use in an image-forming apparatus of an intermediate transfer system, in particular, to a seamless belt without a joint. The transfer belt according to the present invention may be applied to a mono-color image-forming apparatus having only a mono-color toner in its developing device, a full-color image-forming apparatus of a cycle system which is provided with Y (yellow), M (magenta), C (cyan) and B (black) developing devices for a single latent-image supporting member so that a developing process on the latent-image supporting member and a primary transferring process of a toner image onto the transfer belt are carried out on each of developing devices of the respective colors, and a full-color image-forming apparatus of a tandem system in which image-forming units of the respective colors, each having one developing device for one latent-image supporting member, are placed in series with one another so that a developing process on the latent-image supporting member and a primary transferring process of a toner image onto the transfer belt are carried out for each of the image-forming units of the respective colors. By applying the transfer belt of the present invention, it becomes possible to achieve an image-forming apparatus which can restrain an image loss in characters and toner scattering.

For example, in a full-color image-forming apparatus of the tandem system as shown in FIG. 1, a transfer belt 1 is passed over several rollers 2, 3, 4 and the like, and Y (yellow), M (magenta), C (cyan) and B (black) image-forming units 5, 6, 7 and 8 are placed along the transfer belt 1 in series with one another. The transfer belt 1 is rotated in a direction indicated by an arrow so that toner images, formed on latent-image supporting members (photosensitive members) (9, 10, 11 and 12) in the respective image-forming units, are successively primary-transferred on the transfer belt 1 by primary transfer rollers (13, 14, 15 and 16). Thereafter, the toner images of the four colors, formed on the transfer belt 1, are secondary-transferred onto a recording material (recording paper) 18 between a secondary transfer roller 17 and a pressing roller 2.

In the respective image-forming units (5, 6, 7 and 8), the surfaces of the latent-image supporting members (9, 10, 11 and 12) are uniformly charged by a charger (for example, 19), and an electrostatic latent image corresponding to an image is then formed thereon by an exposing device (for example, 20). The electrostatic latent image is developed by a developing device (for example, 21) so that, after the toner image has been transferred onto the transfer belt by a primary transfer roller (for example, 13), residual toner is removed therefrom by a cleaner or the like, not shown.

EXAMPLES

Glass Transition Temperature

A glass transition temperature (Tg) was obtained by the intersection point of between a L/2 straight line and a heat absorption curve by using the aforementioned method, in the glass transition portion from 50° C. to 100° C. in a graph of a quantity of heat (vertical axis)-temperature (horizontal axis) measured at a temperature-increasing rate of 5° C./min by using the DSC method (MIT)

An MIT value was measured by using an MIT rubbing fatigue tester MIT-D made by Toyo Seiki Seisaku-sho, Ltd., under conditions of an applied weight of 250 g, a swing angle of 90° and the number of 175 times/min. The value was indicated by the number of swings at the time of rupturing, and the average value of five samples was used. The MIT value of 4000 or more is a range causing no problems in practical use, and the MIT value is preferably set to 5000 or more, more preferably to 7000 or more.

(Surface Resistance)

A surface resistivity was measured by using a resistor (Hirester made by Mitsubishi Petrochemical Co., Ltd.) at a measuring voltage of 500 V and a measuring period of time of 10 seconds. With respect to the measurements on the surface resistivity, measuring processes were carried out on the entire circumference with intervals of 20 mm in a direction perpendicular to the extrusion direction so that measured values of the total 24 points were obtained, and the average value and the resistance deviation were evaluated. The resistance deviation was indicated by using logarithm. In other words, with respect to the surface resistance values R of the 24 points measured in the evaluating process of the conductivity, the maximum value $R_{MAX}$ and the minimum value $R_{MIN}$ were extracted and the resistance deviation was represented by Log $(R_{MAX}/R_{MIN})$. The resistance deviation of 1.0 or less is a range causing no problems in practical use, and it is preferably set to 0.8 or less.

Figure 5:
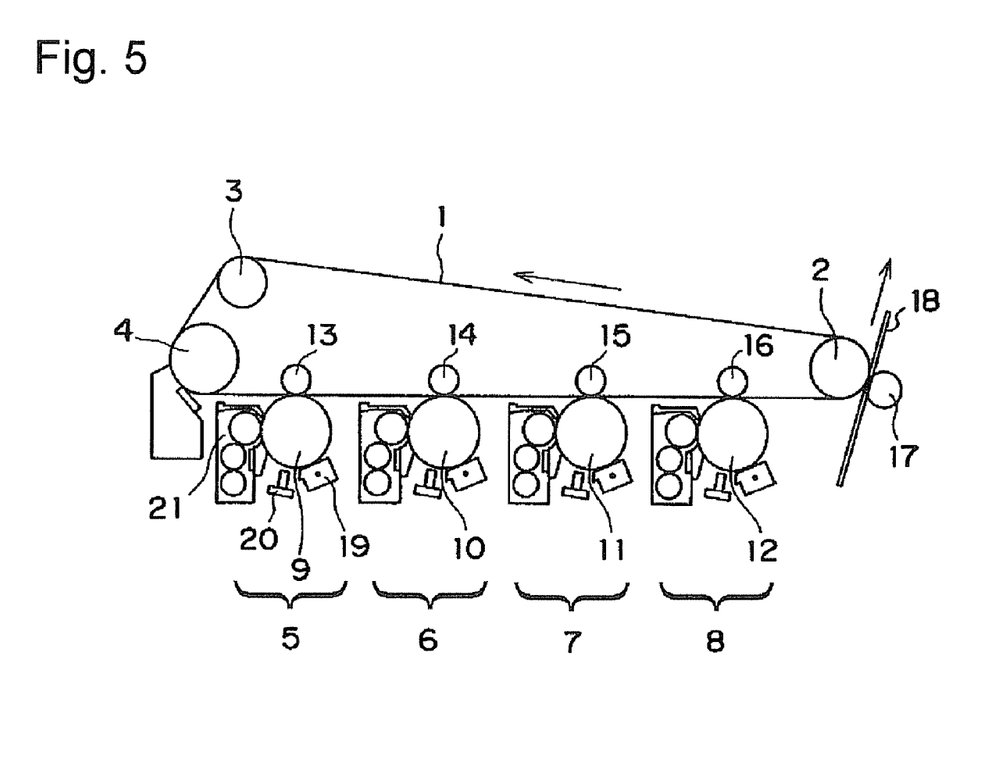
FIG. 5 is a schematic structural drawing that shows one example of an image-forming apparatus of the present invention.

Each of the transfer belts obtained in the respective Examples and Comparative Examples was attached to a copying machine Color Page Pro (made by Konica Minolta Business Technologies, Inc.) having a structure as shown in FIG. 5, and a character image (3 points, 5 points) having a pixel ratio of 7% was printed on woodfree paper of A-4 size (64 g/m²).

During continuous printing processes, 5 sheets of samples for use in evaluation were taken at each of the times of 1000 copies, 5000 copies and 10000 copies.

<Image Loss in Character Image>

Each of character images printed under high-temperature/high-humidity environment (30° C., 80% RH) was observed under magnification by a loupe, and evaluation was visually made as to whether or not any image loss occurred in the character image.

Evaluation Criteria

○: No image loss was observed up to the completion of printing processes of 10000 sheets;

Δ: Although no image loss was observed up to the completion of printing processes of 5000 sheets, an image loss occurred in the 10000-th printed sheet (problems in practical use); and x: A remarkable image loss occurred in the 1000-th printed sheet.

<Toner Scattering>

Each of character images printed under low-temperature/low-humidity environment (10° C., 20% RH) was observed under magnification by a loupe, and evaluation was visually made as to whether or not any toner scattering occurred on the periphery of a character portion.

Evaluation Criteria

○: Little toner scattering was observed up to the completion of printing processes of 10000 sheets;

Δ: Although little toner scattering was observed up to the completion of printing processes of 5000 sheets, much toner scattering occurred in the 10000-th printed sheet (problems in practical use); and x: Toner scattering increased in printed sheets of 1000 sheets or less, resulting in problems in practical use.

In the present Examples, a twin-screw extrusion-molding machine (number of screw revolutions of 350 rpm), made by Kobe Steel., Ltd., was used.

Example 1

A mixture of PPS (polyphenylene sulfide: made by Toray Industries, Inc.) (84 kg), 6-nylon (average particle size: 2 mm, made by Toray Industries, Inc.) (6 kg) and acidic carbon (made by Degussa Corp.) (10 kg) was melt-kneaded by a twin-screw extrusion-kneader at 310° C., and then pelletized to obtain a resin composition a1 (preliminary melt-kneading process). The resin composition a1 thus obtained was measured on Tg. As a result of the thermal analysis of this resin composition a1, as shown in FIG. 3, Tgs were observed with respect to each Tg of 6-nylon and PPS. Next, the resin composition a1 was melt-kneaded at 310° C. by using a twin-screw extrusion-kneader to which a metal mold die having a slit with a gap distance of 0.9 mm was attached, and after having been extruded through the slit, the kneaded matter was immersed in water at 25° C. to be quickly cooled, and pulverized so that a resin composition a2 was obtained (first melt-kneading process). When this resin composition a2 was measured on Tg, only one Tg was observed at 85.9° C. as shown in FIG. 1 (FIG. 2 shows an enlarged portion of the Tg portion). After the resin composition a2 had been extrusion-molded at 310° C. by using a molding machine to which an annular metal mold die was attached, the resulting molded product was made in contact with a sizing die of 25° C. to be quickly cooled so that an intermediate transfer belt (thickness: 0.1 mm) having a seamless annular shape was obtained (molding process). The surface resistivity and its deviation, MIT value and filming resistance of the intermediate transfer belt were evaluated. The intermediate transfer belt had Tg that was the same as the Tg of the resin composition a2. Here, the peak molecular weight was measured through gel permeation chromatography.

Example 2

A mixture of PPS (polyphenylene sulfide: made by Toray Industries, Inc.) (90 kg), 6-nylon (average particle size: 2 mm, made by Toray Industries, Inc.) (4 kg) and acidic carbon (made by Degussa Corp.) (10 kg) was melt-kneaded by a twin-screw extrusion-kneader at 310° C., and the kneaded matter was then left so as to be cooled, and pulverized to obtain a resin composition b1 (preliminary melt-kneading process). The resin composition b1 thus obtained was measured on Tg. As a result of the thermal analysis of this resin composition b1, virtually the same graph as that of FIG. 3 was obtained, and Tgs were observed with respect to each Tg of 6-nylon and PPS. Next, the resin composition b1 was melt-kneaded at 300° C. by using a twin-screw extrusion-kneader to which a metal mold die having a slit with a gap distance of 0.9 mm was attached, and after having been extruded through the slit, the kneaded matter was immersed in water at 25° C. to be quickly cooled, and pulverized so that a resin composition b2 was obtained (first melt-kneading process). When this resin composition b2 was measured on Tg, virtually the same graph as that of FIG. 1 was obtained, and only one Tg was observed at 86.2° C. After the resin composition b2 had been extrusion-molded at 310° C. by using a molding machine to which an annular metal mold die was attached, the resulting molded product was made in contact with a sizing die of 25° C. to be quickly cooled so that an intermediate transfer belt (thickness: 0.1 mm) having a seamless annular shape was obtained (molding process). The surface resistivity and its deviation, MIT value and filming resistance of the intermediate transfer belt were evaluated. The intermediate transfer belt had Tg that was the same as the Tg of the resin composition b2.

Example 3

A mixture of PPS (polyphenylene sulfide: made by Toray Industries, Inc.) (84 kg), 66-nylon (average particle size: 2 mm, made by E. I. DuPont de Nemours and Company) (6 kg) and acidic carbon (made by Degussa Corp.) (10 kg) was melt-kneaded by a twin-screw extrusion-kneader at 305° C., and the kneaded matter was then left so as to be cooled, and pulverized to obtain a resin composition c1 (preliminary melt-kneading process). The resin composition c1 thus obtained was measured on Tg. As a result of the thermal analysis of this resin composition c1, virtually the same graph as that of FIG. 3 was obtained, and Tgs were observed with respect to each Tg of 66-nylon and PPS. Next, the resin composition c1 was melt-kneaded at 300° C. by using a twin-screw extrusion-kneader to which a metal mold die having a slit with a gap distance of 0.9 mm was attached, and after having been extruded through the slit, the kneaded matter was immersed in water at 30° C. to be quickly cooled, and pulverized so that a resin composition c2 was obtained (first melt-kneading process). When this resin composition c2 was measured on Tg, virtually the same graph as that of FIG. 1 was obtained, and only one Tg was observed at 86.8° C. After the resin composition c2 had been extrusion-molded at 310° C. by using a molding machine to which an annular metal mold die was attached, the resulting molded product was made in contact with a sizing die of 25° C. to be quickly cooled so that an intermediate transfer belt (thickness: 0.1 mm) having a seamless annular shape was obtained (molding process). The surface resistivity and its deviation, MIT value and filming resistance of the intermediate transfer belt were evaluated. The intermediate transfer belt had Tg that was the same as the Tg of the resin composition c2.

Comparative Example 1

A mixture of PPS (polyphenylene sulfide: made by Toray Industries, Inc.) (90 kg) and acidic carbon (made by Degussa Corp.) (10 kg) was melt-kneaded by a twin-screw extrusion-kneader at 305° C., and the kneaded matter was then left so as to be cooled, and pulverized to obtain a resin composition d1 (preliminary melt-kneading process). Next, the resin composition d1 was melt-kneaded at 300° C. by using a twin-screw extrusion-kneader to which a metal mold die having a slit with a gap distance of 0.9 mm was attached, and after having been extruded through the slit, the kneaded matter was immersed in water at 30° C. to be quickly cooled, and pulverized so that a resin composition d2 was obtained (first melt-kneading process). When this resin composition d2 was measured on Tg, only one Tg derived from PPS was observed at 96.0° C. After the resin composition d2 had been extrusion-molded at 310° C. by using a molding machine to which an annular metal mold die was attached, the resulting molded product was made in contact with a sizing die of 25° C. to be quickly cooled so that an intermediate transfer belt (thickness: 0.1 mm) having a seamless annular shape was obtained (molding process). The surface resistivity and its deviation, MIT value and filming resistance of the intermediate transfer belt were evaluated. The intermediate transfer belt had Tg that was the same as the Tg of the resin composition d2.

Comparative Example 2

By using the same method as that of Example 1 except that without melt-kneading the resin composition a1 by a twin-screw extrusion-kneader to which metal mold die was attached, it was extrusion-molded by a molding machine to which an annular metal mold die was attached so that an intermediate transfer belt was obtained. The intermediate transfer belt had Tg that was the same as the Tg of the resin composition a1 in Example 1.

Comparative Example 3

By using the same method as that of Example 1 except that in a twin-screw extrusion-kneader to which an annular metal mold die having a slit was attached, the gap distance of the slit thereof was set to 5.0 mm so that an intermediate transfer belt was obtained. The intermediate transfer belt had Tg that was the same as the Tg of the resin composition a1 in Example 1.

Comparative Example 4

By using the same method as that of Example 1 except that after the melt-kneading process by a twin-screw extrusion-kneader to which a metal mold die having a slit was attached, the kneaded matter was left at room temperature of 25° C. to be cooled off so that an intermediate transfer belt was obtained. The intermediate transfer belt had Tg that was the same as the Tg of the resin composition a1 in Example 1.

TABLE 1

|  | Nylon (χ) | Tg (° C.) | Surface resistivity/resistivity deviation | MIT value | Image loss | Toner scattering |
| --- | --- | --- | --- | --- | --- | --- |
| Example 1 | 6-nylon (1.5) | 85.9 | $2 \times 10^{10}$ Ω/0.5 | 10000 | ○ | ○ |
| Example 2 | 6-nylon (1.5) | 86.2 | $1 \times 10^{10}$ Ω/0.5 | 8000 | ○ | ○ |
| Example 3 | 66-nylon (1.5) | 86.8 | $3 \times 10^{10}$ Ω/0.6 | 7000 | ○ | ○ |
| Comparative Example 1 | No | 96.0 | Unmeasurable | 2400 | x | x |
| Comparative Example 2 | 6-nylon (1.5) | 75/89 | $3 \times 10^{10}$ Ω/1.6 | 2900 | Δ | Δ |
| Comparative Example 3 | 6-nylon (1.5) | 75/89 | $2.5 \times 10^{10}$ Ω/2.5 | 2500 | Δ | Δ |
| Comparative Example 4 | 6-nylon (1.5) | 75/89 | $1.5 \times 10^{10}$ Ω/2.0 | 2600 | Δ | Δ |

The resin composition and the extrusion-molded component of the present invention can be applied to wide fields of various kinds, such as electric parts, electronic parts, automobile parts and general machine parts. In particular, when applied to a direct-type transfer belt or an intermediate transfer belt for an electrophotographic image forming apparatus, the transfer belt of the present invention makes it possible to provide a belt that is superior in the resistance stability and the strength in the circumferential direction of the belt.

What is claimed is:

1. An electrophotographic transfer belt, formed of a resin composition comprising a polyphenylene sulfide resin and a nylon resin having a $\chi$-parameter of 1.3 or more at 25° C., and having one glass transition temperature, wherein the $\chi$-parameter is measured by executing a program SUSHI by using J-OCTA.

2. The electrophotographic transfer belt according to claim 1, wherein the glass transition temperature is 88° C. or less.

3. The electrophotographic transfer belt according to claim 1, wherein the $\chi$-parameter is in a range from 1.3 to 5.0.

4. The electrophotographic transfer belt according to claim 2, wherein the glass transition temperature is in a range from 80 to 88° C.

* * * * *